3,284,286
METHOD FOR DESTROYING NEMATODES WITH 2-CHLOROALLYL ISOTHIOCYANATE
Abron B. Gee, St. Louis, Mo., Harry C. Fink, San Luis Obispo, Calif., and David J. Beaver, Richmond Heights, Mo., assignors to Monsanto Company, a corporation of Delaware
No Drawing. Filed Apr. 2, 1963, Ser. No. 269,857
2 Claims. (Cl. 167—22)

This invention relates to methods of destroying parasitic nematodes, particularly the soil phase of nematode parasites in all forms through which they pass in a life cycle, e.g. as eggs, larvae and adults.

In accordance with this invention it has been found that that haloalk-2-enyl isothiocyanates are effective in the control of nematode parasites in the environment which they naturally occur, particularly agricultural soils, the said haloalk-2-enyl isothiocyantes being of the formula X—CY=CZ—CH$_2$—NCS wherein X is hydrogen, methyl or halogen of atomic weight in the range of 35 to 80 (i.e. chlorine or bromine), wherein Y is hydrogen or halogen of atomic weight in the range of 35 to 80, wherein Z is hydrogen or halogen of atomic weight in the range of 35 to 80, and wherein at least one of X, Y and Z is halogen of atomic weight in the range of 35 to 80.

The haloalk-2-enyl isothiocyanates can be prepared by a variety of methods, for example by isomerizing the corresponding haloalk-2-enyl thiocyanate usually by merely heating the latter. They can also be prepared by the method of Dixon, Journal of the Chemical Society, volume 79, page 554, which comprises mixing the appropriate haloalk-2-enyl chloride with an excess of warm alcoholic potassium thiocyanate (KSCN), allowing the mixture to stand for several days with occasional agitation, and thereafter boiling the mixture. When the isothiocyanate product is a liquid it is conveniently recovered by steam distillation and when it is a solid it is conveniently recovered by filtering off the precipitate and water washing the precipitate free of potassium chloride. Exemplary of haloalk-2-enyl chloride precursors are 2-chlorollyl chloride, 3-chlorollyl chloride, 2-chlorobut-2-enyl, 3-chlorobut-2-enyl chloride, cis and trans 2,3-dichloroallyl chloride, 2,3,3-trichloroallyl chloride, 2,3-dichlorobut-2-enyl chloride, 3,3-dichloroallyl chloride, 2-bromoallyl chloride, 3-bromoallyl chloride, cis and trans 2,3-dibromoallyl chloride, 2,3,3-tribromoallyl chloride, 2,3 - dibromobut-2-enyl chloride, 2-chloro-3-bromoallyl chloride, 2-bromo-3,3-dichloroallyl chloride, and the like.

As illustrative of the nematocidal activity of the haloalk-2-enyl isothiocyanates of this invention but not limitative thereof is the following:

(1) A 4 week old culture of the vinegar eel worm, *Turbatrix aceti*, in equal volumes of plain vinegar and distilled water is admixed with an equal volume of distilled water. The mixture is agitated and sufficient thereof added to a plastic vial containing 2-chloroallyl isothiocyanate to provide a concentration of 3 p.p.m. of 2-chloroallyl isothiocyanate. The vial is capped and shaken to assure a good mixture of the contents thereof. Needle holes are made in the vial cap to permit air circulation. After one week at room temperature complete kill of the nematode was observed. In contrast 2- chlorollyl thiocyanate at the same concentration exhibited no kill.

(2) To approximately 400 grams of a sandy loam soil infested with the larvae, eggs and adults of the tomato root knot nematode, *Meloidogyne javanica*, is added and intimately mixed approximately 0.18 gram of 2-chloroallyl isothiocyanate. This mixture is placed in a one pint Mason jar, the jar capped, and permitted to stand for 7 days at room temperature. The soil is then potted and allowed to aerate for 7 days. Seedling tomato plants (Improved Pearson) are then transplanted in the aerated potted soil. After 4 weeks the plants were removed and examination thereof showed no nematode damage. In contrast the control plants were severely damaged by the said nematode.

(3) To approximately 400 grams of a sandy loam soil infested with the larvae, eggs and adults of the sugar beet nematode, *Heterodera schachtii*, is added and intimately mixed approximately 0.025 gram of 2-chloroallylisothiocyanate. This mixture is placed in a one pint Mason jar, the jar stoppered, and permitted to stand for 7 days at room temperature. The soil is then potted and allowed to aerate for 7 days. Seedling brussel sprout plants are then transplanted in the aerated soil. After 4 weeks the plants were removed and examination thereof showed no nematode damage. In contrast the control plants were severely damaged by the said nematode.

(4) To approximately 400 grams of a sandy loam soil infested with the larvae, eggs and adults of the grape pathogen, *Xiphenema index*, is added and intimately mixed approximately 0.025 gram of 2-chloroallyl isothiocyanate. This mixture is placed in a one pint Mason jar, the jar stoppered, and permitted to stand for 7 days at room temperature. The soil is then potted and allowed to aerate for 7 days. After 4 weeks, examination of the soil showed no nematode life. In contrast the control was alive with the nematode.

Other effective nematocidal agents, particularly against the soil-phase of parasitic nematodes, include 3-chloroallyl isothiocyanate, cis and trans 2,3-dichloroallyl isothiocyanate, 2,3,3-trichloroallyl isothiocyanate, 2,3-dichlorobut-2-enyl isothiocyanate, 2-bromoallyl isothiocyanate, 3-bromoallyl isothiocyanate, 2,3-dibromobut-2-enyl isothiocyanate, 2-bromo-3,3-dichloroallyl isothiocyanate. A particularly useful class of nematocidal agents of this invention are those of the formula $$C_2H_{3-n}Cl_n—CH_2—NCS$$

wherein $n$ is a whole number from 1 to 3.

Although the novel nematocidal agents of this invention are useful per se in controlling a wide variety of parasitic nematodes, it is preferable that they be supplied to the organism or to the environment of the organisms in a dispersed form in a suitable extending agent.

In the instant specification and appended claims it is to be understood that the term "dispersed" is used in its widest possible sense. When it is said that the nematocidal agents of this invention are dispersed, it means that the particles of the nematocidal agents of this invention may be molecular in size and held in true solution in a suitable organic solvent. It means further, that the particles may be collodial in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the nematocidal agents of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the nematocidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the nematocidal agents of this invention employed in combatting or controlling parasitic nematodes can vary considerably provided the required dosage (i.e. toxic or lethal amount) thereof is supplied to the organisms or to the environment of the organisms. When the extending agent is a liquid or mixture of liquids (e.g. as in solutions, suspensions, emulsions, or aerosols) the concentration of the nematocidal agent employed to supply the desired dosage generally will be in the range of 5 to 50 percent by weight. When the extending agent is a semi-solid or solid, the concentration of the nematocidal agent employed to supply the desired dosage generally will be in the range of 5 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared nematocidal spray or particulate solid. In such a concentrate composition, the nematocidal agent generally will be present in a concentration of 5 to 95 percent by weight, the residue being any one or more of the well-known nematocidal adjuvants, such as the various surface active agents (e.g. detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the nematocidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80°F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the nematocidal agents of this invention are to be supplied to the organisms or to the environment of the organisms as aerosols, it is convention to dissolve them in a suitable solvent and disperse the resulting solution in dichlorodifluoromethane or like chlorofluoroalkane which boils below room temperature at atmospheric pressure.

The nematocidal agents of this invention are preferably supplied to the organisms or to the environment of the organisms in the form of emulsions or suspensions. Emulsions or suspensions are prepared by dispersing one or more nematocidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent" to connote generically the various "emulsifying agents," "dispersing agents," "wetting agents" and "spreading agents" that are adapted to be admixed with the nematocidal agents of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known non-ionizing (or non-ionic) capillary-active substances which are described in detail in volumes I and II of Schwartz, Perry and Berch's "Surface Active Agents and Detergents" (1958, Interscience Publishers, Inc., New York), and also in the November 1947 issue of Chemical Industries (pages 811–824), in an article entitled, "Synthetic Detergents," by John W. McCutcheon and also in the July, August, September and October, 1952 issues of Soap and Sanitary Chemicals under the title, "Synthetic Detergents." The disclosures of these articles with respect to surfactants, i.e., the non-ionizing capillary-active substances, are incorporated in this specification by reference in order to avoid unnecessary enlargement of this specification. The preferred surfactants are the water-soluble polyoxyethylene non-ionic surface-active agents set forth in U.S. 2,846,398 (issued August 5, 1958).

The nematocidal agents of this invention can be dispersed by suitable methods (e.g. tumbling or grinding) in solid extending agents either of organic or inorganic nature and supplied to the organism's environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include, for example, such materials of organic nature as powdered cork, powdered wood, and powdered walnut shells. These mixtures can be used for nematocidal purposes in the dry form, or, by addition of water-soluble surfactants or wetting agents the dry particulate solids can be rendered wettable by water so as to obtain stable aqueous dispersions or suspensions suitable for use as sprays.

For special purposes the nematocidal agents of this invention can be dispersed in a semi-solid extending agent such as petrolatum or soap (e.g. sodium stearate or oleate or palmitate or mixtures thereof) with or without the aid of solubility promoters and/or surfactants or dispersing agents.

In all of the forms described above the dispersions can be provided ready for use in combatting parasitic nematodes or they can be provided in a concentrated form suitable for mixing with or dispersing in other extending agents. As illustrative of a particularly useful concentrate is an intimate mixture of one or more nematocidal agents of this invention with a water-soluble surfactant which lowers the surface tension of water in the weight proportions of 0.1 to 15 parts of surfactant with sufficient of the nematocidal agent of this invention to make 100 parts by weight. Such a concentrate is particularly adapted to be made into a spray for combatting various forms of nematocidal organisms by the addition of water thereto. As illustrative of such a concentrate is an intimate mixture of 95 parts by weight of 2-chloroallyl isothiocyanate and 5 parts by weight of a water-soluble non-ionic surfactant such as the polyoxyethylene derivative of sorbitan monolaurate.

Another useful concentrate adapted to be made into a spray for combatting nematocidal organisms is a solution (preferably as concentrated as possible) of one or more nematocidal agents of this invention in an organic solvent therefor. The said liquid concentrate preferably contains dissolved therein a minor amount (e.g. 0.5 to 10 percent by weight of the weight of the new nematocidal agent) of a surfactant (or emulsifying agent), which surfactant is also water-soluble. As illustrative of such a concentrate is a solution of 2-chloroallyl isothiocyanate in kerosene which solution contains dissolved therein a water-soluble polyoxyethylene glycol non-ionic surfactant.

Of the surfactants aforementioned in preparing the various emulsifiable, wettable or dispersible compositions or concentrates of this invention, the non-ionic surfactants are preferred. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for nematocidal purposes, the active ingredients can be one or more of the compounds of this invention. The compounds of this invention can also be advantageously employed in combination with other pesticides, including, for example, insecticides, fungicides, bactericides, and herbicides. In this manner it is possible to obtain mixtures which are effective against a wide variety of pests and other forms of noxious life.

In controlling or combatting parasitic nematodes the nematocidal agents of this invention either per se or compositions comprising same are supplied to the organisms or to their environment in a lethal or toxic amount. This can be done by dispersing the new nematocidal agent or nematocidal composition comprising same in, on or over an infested environment or in, on or over an environment the organisms frequent, e.g. agricultural soil or other growth media or other media infested with the organisms or attractable to the organisms for habitational or sustenance or propagational purposes, in any conventional fashion which permits contact between the organisms and the nematocidal agents of this invention. Such dispersing can be brought about by applying the nematocidal agent per se or sprays or particulate solid compositions containing same to a surface infested with the organisms or attractable to the organisms, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new nematocidal agent per se or spray or particulate solid compositions comprising same with the infested environment or with the environment the organisms frequent, or by employing a liquid carrier for the new nematocidal agent to accomplish sub-surface penetration and impregnation therein.

In the use of isothiocyanates of this invention as nematocides or soil fumigants the active compound, diluted or undiluted, ordinarily will be applied to or incorporated in the soil at the rate of 5 to 200 pounds per acre. The preferred application for treating agricultural soils of average nematode infestation will be from 25 to 100 pounds per acre.

While this invention has been described with respect to certain embodiments, it is to be understood that it is not so limited and that variations and modifications thereof obvious to those skilled in the art can be made without departing from the spirit and scope thereof.

The embodiments of the invention in which an exclusive property or privilege is claimed are defined as follows:

1. The method of destroying the soil phase of parasitic nematodes which comprises incorporating in the nematode-infested soil 2-chloroallyl isothiocyanate at a rate of 5 to 200 pounds per acre.

2. The method of destroying the soil phase of parasitic nematodes which comprises incorporating in the nematode-infested soil a nematocidally toxic amount of 2-chloroallyl isothiocyanate.

References Cited by the Examiner
UNITED STATES PATENTS

| | | | |
|---|---|---|---|
| 2,486,090 | 10/1949 | Abramovitch | 260—454 |
| 2,613,221 | 10/1952 | Ladd et al. | 260—454 |
| 2,722,478 | 11/1955 | Olin | 167—39 X |
| 2,757,190 | 7/1956 | Jones et al. | 260—454 |
| 2,972,561 | 2/1961 | Suhovecky et al. | 167—22 |
| 3,170,942 | 2/1965 | Fancher et al. | 260—454 |

OTHER REFERENCES

Chem. Abst., vol. 43 (1948), p. 1016.
Chem. Abst., vol. 52 (1957), p. 16685.

JULIAN S. LEVITT, *Primary Examiner.*

GEORGE A. MENTIS, *Assistant Examiner.*